A. J. GURNEY.
GATE OPERATING MECHANISM.
APPLICATION FILED JAN. 21, 1914.
1,141,627.
Patented June 1, 1915.
6 SHEETS—SHEET 4.
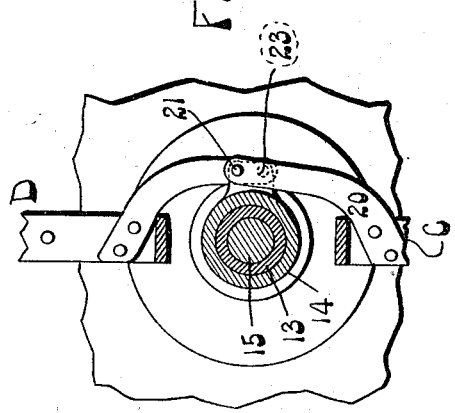
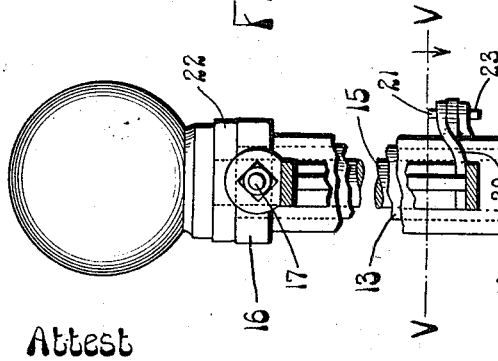
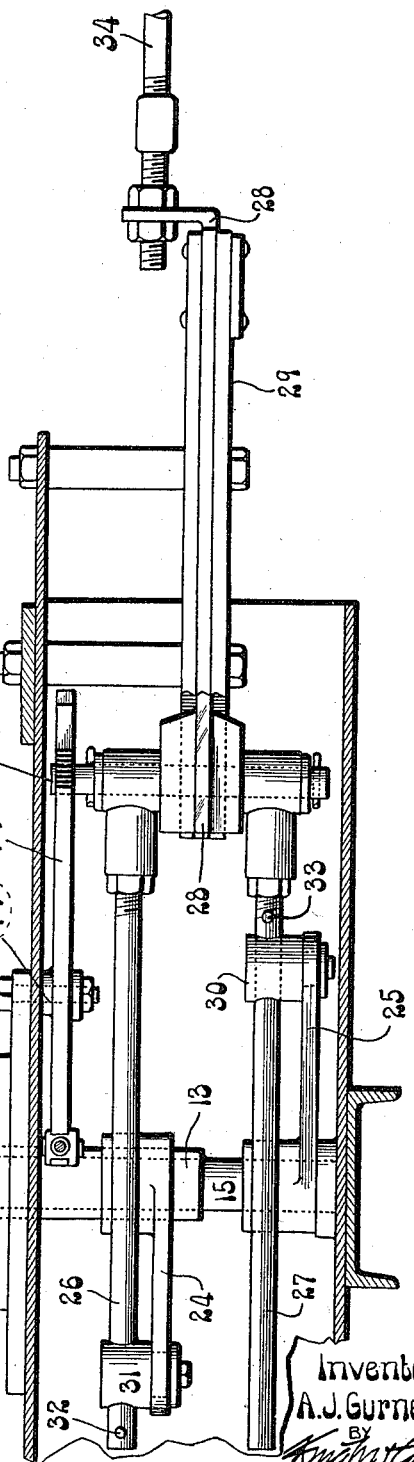
Attest
A. J. McCauley
E. B. Linn
Inventor
A. J. Gurney
BY
Knight & Co.
ATTYS.

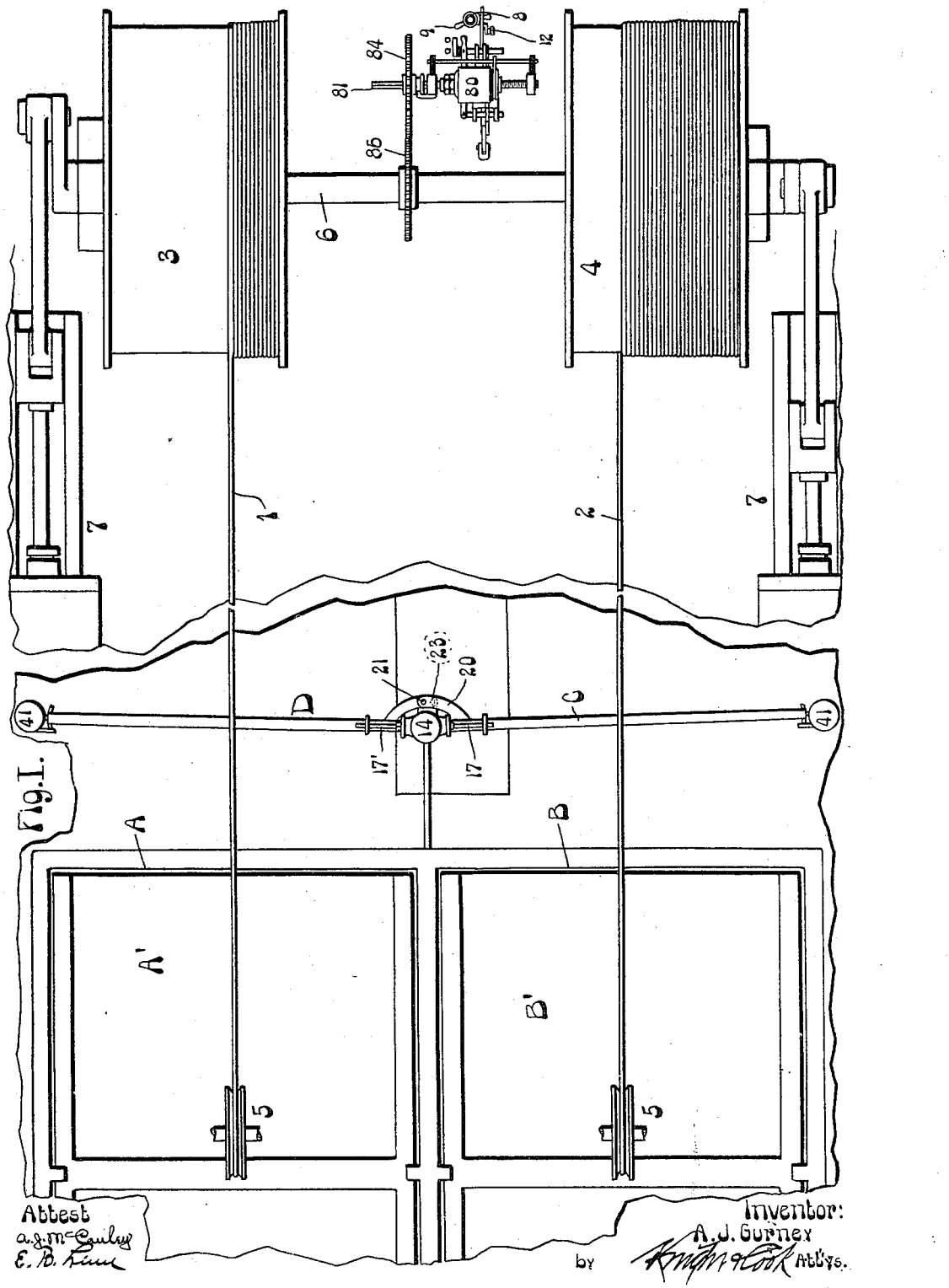

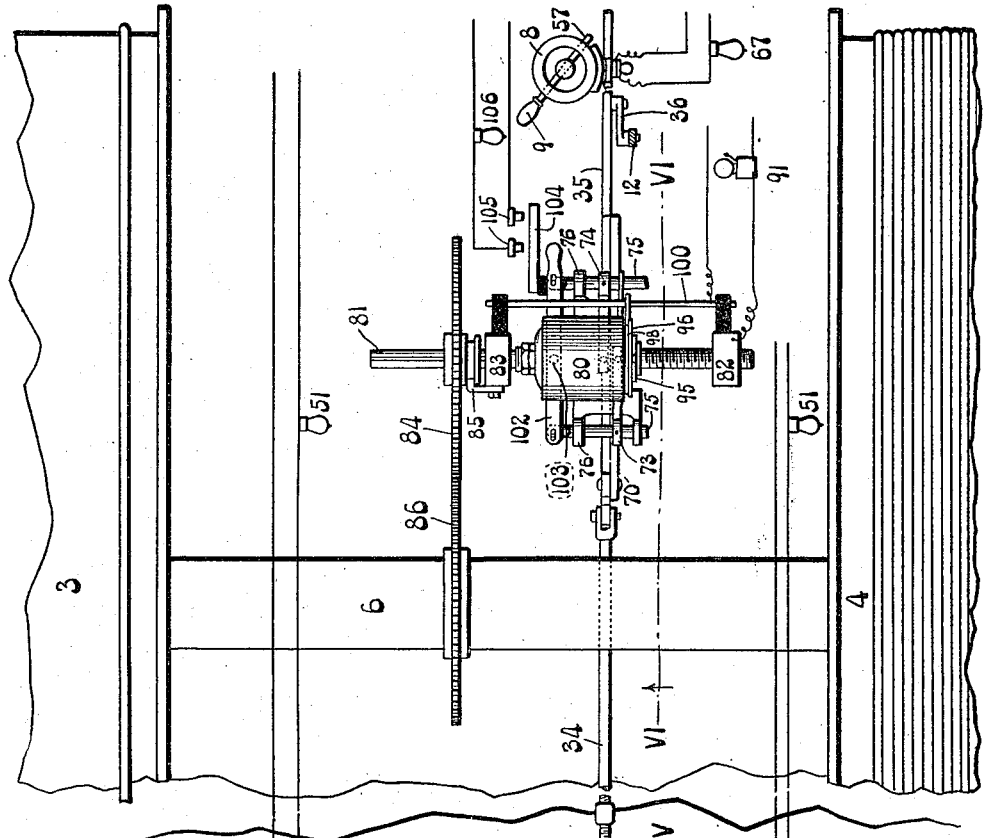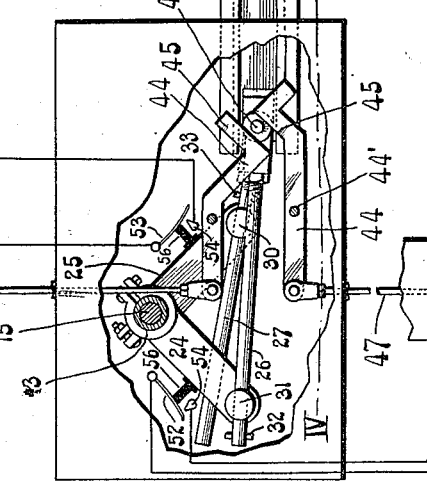

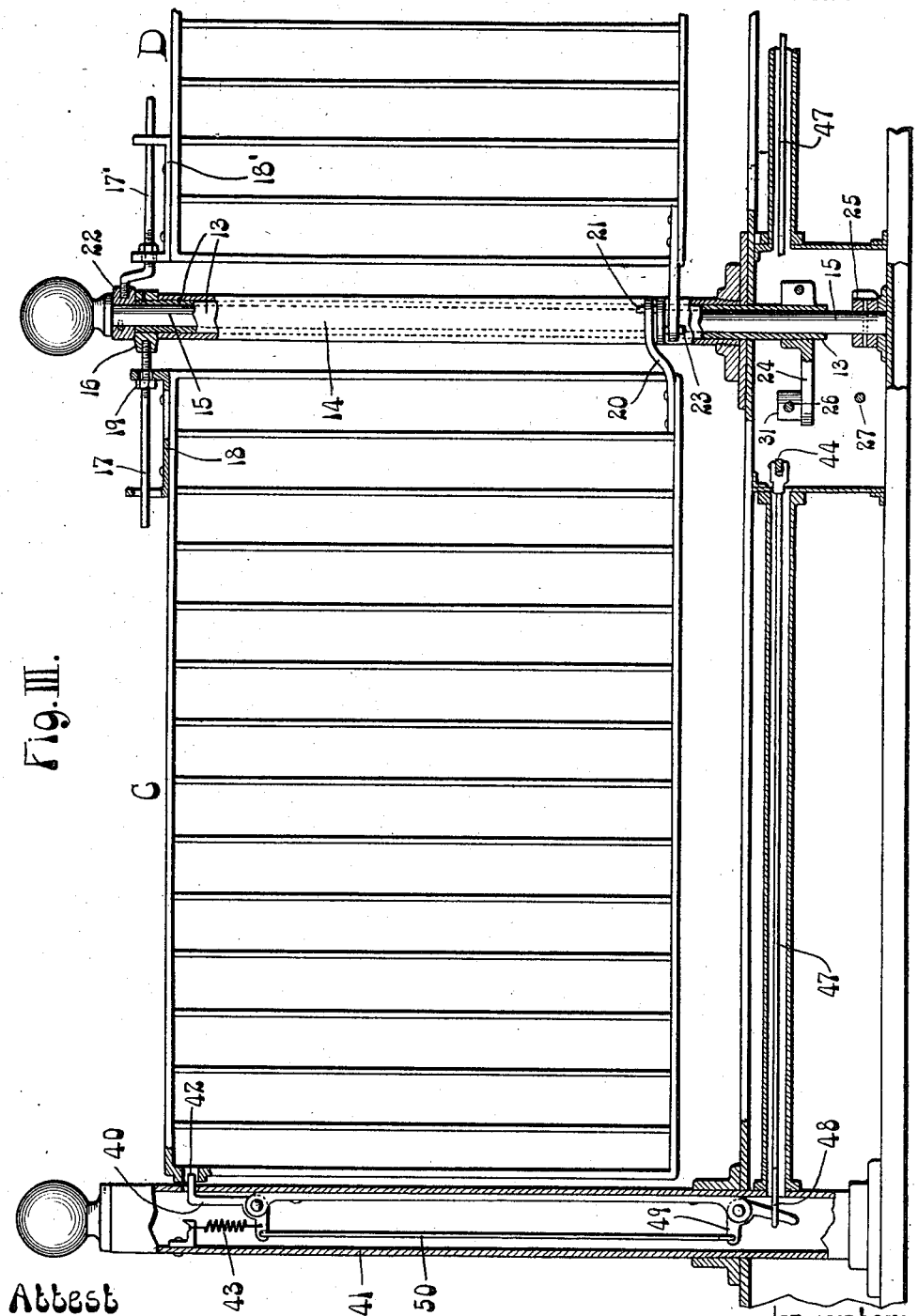

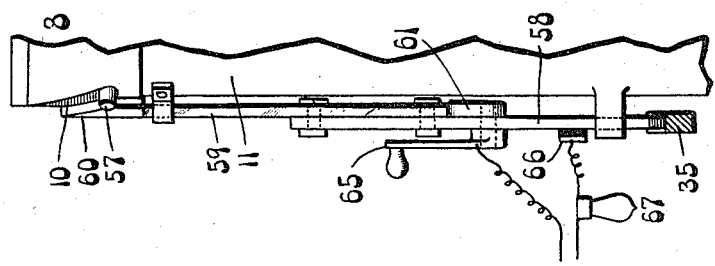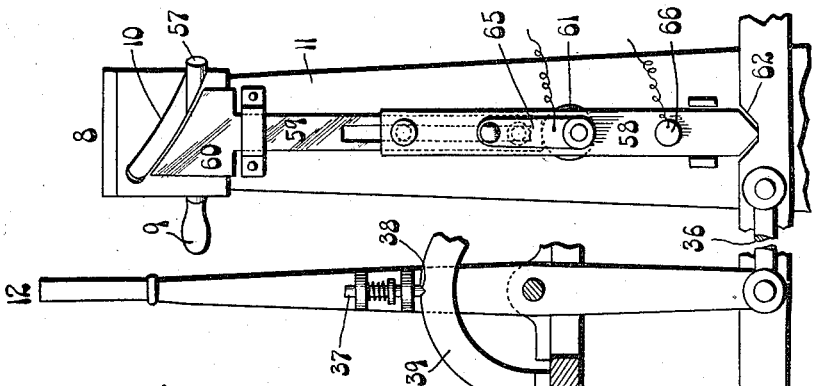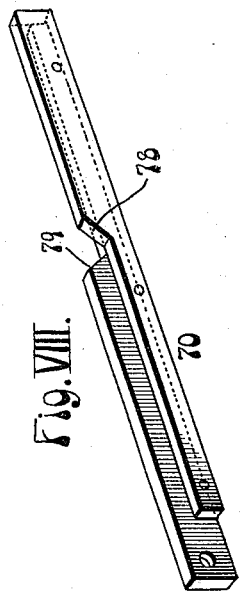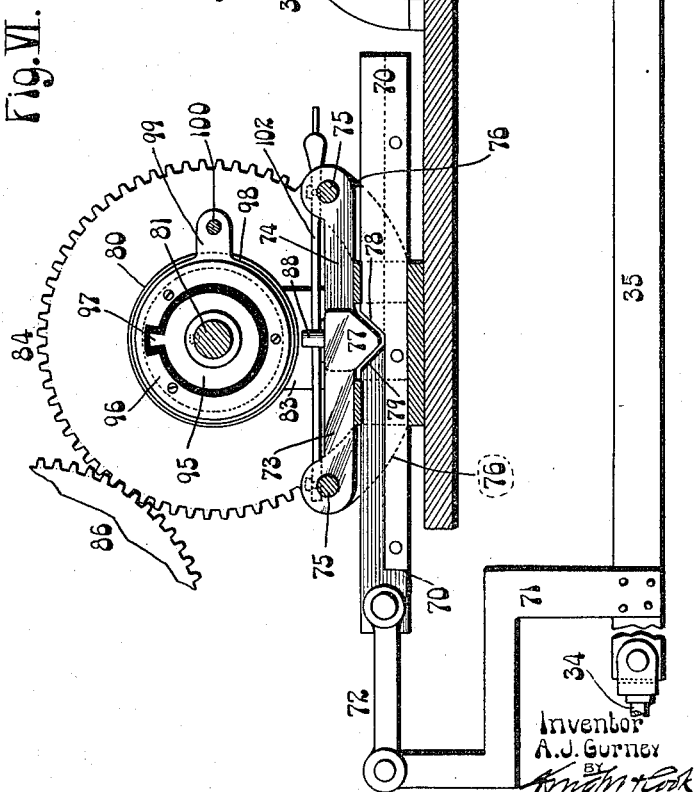

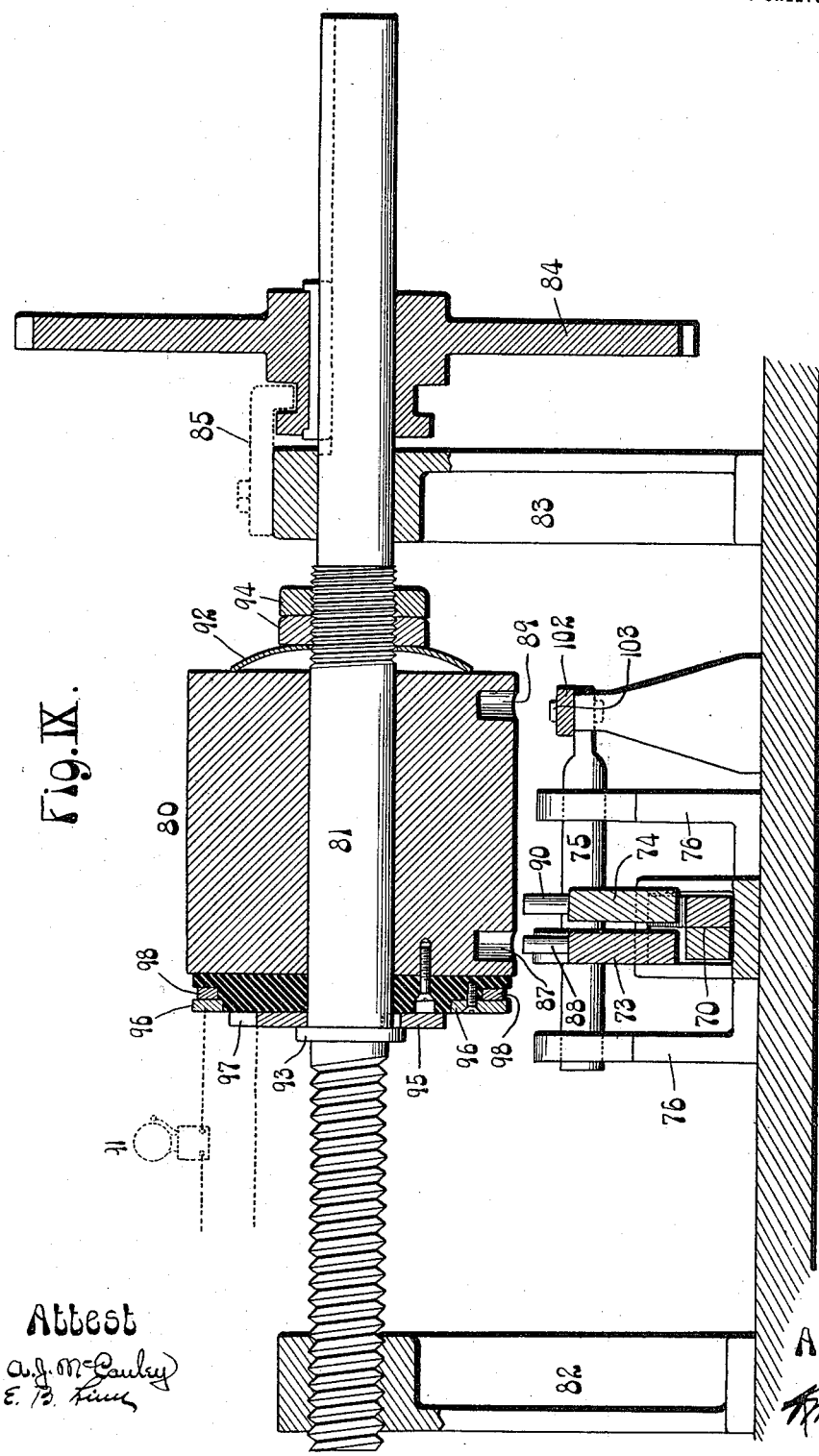

UNITED STATES PATENT OFFICE.

ALBERT J. GURNEY, OF HERRIN, ILLINOIS.

GATE-OPERATING MECHANISM.

1,141,627.  Specification of Letters Patent.  Patented June 1, 1915.

Application filed January 21, 1914. Serial No. 813,540.

*To all whom it may concern:*

Be it known that I, ALBERT J. GURNEY, a citizen of the United States of America, residing at Herrin, in the county of Williamson, State of Illinois, have invented certain new and useful Improvements in Gate-Operating Mechanisms, of which the following is a full, clear, and exact description, reference being had to the accompanying drawings, forming a part of this specification.

My invention relates to gate operating mechanism more particularly adapted to operate or control the operation of gates at the entrances to mine shafts.

The cages or elevators in mine shafts are usually under the control of an operator located at a point remote from the shafts, and the entrances to such shafts are usually open or provided with gates under the control of persons desiring to enter and depart from the mine. Obviously, accidents are quite likely to occur where a number of persons are permitted to congregate at the entrances to open mine shafts, and it has been found that a large number of the accidents in mines are due to the lack of facilities for controlling the gates at the entrances of the shafts.

My invention relates to safety devices including gates at the entrances to such shafts under the absolute control of the person who controls the operation of the cages.

The invention also includes certain safety devices whereby the operator is prevented from accidentally opening a gate when the cage is removed from the entrance to the shaft, and another safety device is employed to prevent the accidental starting of a cage while the gate is open. For certain purposes to be hereinafter set forth, some of the safety devices may be rendered ineffective and I therefore provide indicators or signals for automatically warning the operator of the ineffective or inoperative condition of the safety devices.

Other objects and advantages as well as the novel details of construction will be hereinafter described and pointed out in the claims.

Figure I is a top or plan view, partly broken away, showing mine shafts, means for operating the cages in said shafts, and my gate controlling devices associated therewith. Fig. II is an enlarged fragmentary top or plan view of some of the parts shown in Fig. I, the housing for the gate operating devices being broken away. Fig. III is a vertical section illustrating the gates and the locking devices therefor. Fig. IV is an enlarged vertical section taken approximately on the line IV—IV, Fig. II. Fig. V is a horizonal section taken on the line V—V, Fig. IV. Fig. VI is an enlarged vertical section taken on the line VI—VI, Fig. II, showing the operating handle for controlling the gates and certain locking devices associated therewith. Fig. VII is a rear elevation of the controller for the cages or elevators, showing the locking device for preventing the operation of said controller while a gate is open. Fig. VIII is a detail perspective view of a slidable latch bar associated with latch dogs shown in Fig. VI. Fig. IX is a longitudinal section of a traveler which moves in unison with the cages and serves to lock and unlock the gate controlling devices, one of the gates being under the control of said devices when a cage reaches the entrance to the shaft.

Referring now to Fig. I, A and B designate mine shafts, A' and B' are cages operable in said shafts, and C and D are gates closing the entrances to said shafts. The cages are raised and lowered through the medium of cables 1 and 2 wound around drums 3 and 4, passing over pulleys 5 above the mine shafts and secured to the cages in any suitable manner. The drums 3 and 4 are secured to a crank shaft 6 driven by a motor consisting of two engines 7. The cables are so wound onto the drums 3 and 4 that one of the cages is located at the upper end of the shaft when the other cage is at the lower end of the shaft.

8 designates a motor controller in the form of a throttle valve adapted to control the operation of the engines 7, said controller being provided with a handle 9 extending through slots 10 in the upper end of a valve housing 11. It is to be understood that the motor and its controller 8 is usually located in an engine house at a point remote from the mine shafts, and that the operator at the controller has absolute control of the movements of the cages in the mine shafts.

Before describing the details of construction of my gate controlling devices and the various signals associated therewith, I will briefly set forth the objects and functions of some of these devices. One of the principal objects is to place the gates C and D under the control of the operator having control of the movements of the cages and a gate operating lever 12 is therefore located adjacent to the motor controller 8. When the gates are closed they are locked automatically and cannot be unlocked by a person at the entrance to the mine shafts. Either gate may be unlocked and opened by the operator of lever 12, but certain locking devices are employed to prevent the operation of said lever when the cages are above or below the entrances to the shafts. In loading a cage, it is sometimes desirable to open a gate while the cage is located below the entrance, and I therefore provide means for unlocking the lever 12, but this means is under the control of the engine operator; and when it is utilized a signal is brought into service to warn the operator of the inoperative condition of the locking means. When a gate occupies its open position, the operator is notified by a signal which remains in service until the gate is fully closed. Under normal conditions, the operator is prevented from starting the motor while a gate is open, the motor controller 8 being provided with an automatic lock which is effective when a gate occupies its open position. For certain purposes, this automatic lock may be rendered inoperative, and if the operator starts the motor while a gate is open, and while said lock is ineffective, a danger signal automatically comes into service.

The means for opening the gates comprises a tube 13, rotatably mounted in a post 14, located between the gates, and a shaft 15, rotatably mounted in said tube 13, (see Figs. II, III and IV). The gate C is secured to the rotatable tube 13 by means of a collar 16 fixed to the upper end of said tube, and a rod 17 connecting said collar to the upper portion of the gate C. The rod 17 is loosely fitted to a bracket 18 on the gate C, (Fig. III), said rod being provided with a nut 19, engaging an abutment on said bracket. The lower portion of gate C is provided with an extended arm 20 secured to a pivot pin 21 on the fixed post 14. The gate C is pivotally supported at its upper ends and lower ends, the tube 13 constituting the pivotal support for the upper end of the shaft, and it will be noted that the upper and lower pivotal supports are located in different horizontal and vertical planes, so that when the gate is opened by a rotary movement of the tube 13, the free outer edge of the gate will rise, (note the location of pivot 21); and when the gate is released, it will drop by gravity to its closed position. The gate D is secured to the upper end of the inner shaft 15 by a collar 22 fixed to said shaft, and a rod 17' connected to said collar and loosely fitted to the bracket 18' at the upper edge of the gate. The lower edge of gate D is secured to a pivot pin 23. An arm 24 is fixed to the lower end of the tube 13, and a similar arm 25 is fixed to the lower portion of the shaft 15. The means for rocking the arms 24 and 25, for the purpose of opening the gates, comprises rods 26 and 27 pivotally connected to a crosshead 28 mounted in guides 29, said rods being slidably fitted to swivel members 30 and 31 carried by the arms 24 and 25, respectively. The slidable rod 26 is provided with pins 32 adapted to engage the swivel members 31 when the crosshead moves rearwardly, and the slidable rod 27 is provided with pins 33 which engage the swivel member 30 when the crosshead moves forwardly. The crosshead 28 is connected to the gate operating lever 12 in the engine room by means of the following parts: A long connecting rod 34 secured to the crosshead, a slide bar 35 secured to the rear end of said connecting rod, and a link 36 connecting the lower end of the gate operating lever 12 to the slide bar. The lever 12, (Fig. VI), is provided with a detent 37 which projects into a notch 38 in a sector 39 when the lever 12 is in its neutral position. The lever 12 may be operated to slide the crosshead 28 forwardly or rearwardly; and, when the crosshead moves forwardly, the rod 26 slides idly in the swivel member 31, while the pin 33 on the rod 27 engages the swivel member 30, with the result of rocking the arm 25, thereby turning the shaft 15 so as to open the gate D. When the gate operating lever 12 is rocked to open the gate C, the cross head 28 is pulled rearwardly and the pin 32 at the end of rod 26 is engaged with the swivel member 31 on the arm 24, so as to rock said arm as well as the gate C, which is secured to the upper end of the tube 13. Each gate is normally locked in its closed position by a yieldable latch member 40, (Fig. III), arranged in a gate post 41. Each latch member 40 is preferably a bell crank lever having a finger 42 extending through the post 41 and into the end of a gate.

43 designates a restoring spring tending to retain the latch member in the position shown in Fig. III. The means for unlocking the gates, (Figs. II, III and IV), comprises levers 44 pivoted at 44', each of said levers having a cam face 45, adapted to be engaged by a pin 46 extending upwardly from the cross head 28. Pull rods 47 connected to the levers 44 are formed with loops 48 which lie partly within the posts 41, and bell crank levers 49 pivoted to said posts are provided with depending arms which extend into the loops 48. Each bell crank lever 49 is connected to a latch member 40 by a vertical pull rod 50, shown in Fig. III. When the gate operating lever 12 is actuated to open one of the gates, the pin 46 on the cross head 28 slides along the cam face on one of the levers 44 so as to rock said lever, and unlock the gate before the pins 32 or 33 engage the swivel member on the gate operating arm.

To notify the operator when one of the gates is open, signal lamps 51 are located adjacent to the gate operating lever, (Fig. II), said signal lamps being controlled by switches consisting of spring members 52 and 53, and fixed members 54. Feed wires 55 lead from the switches to the lamps. When the gates are closed, the spring members of the switches are forced away from the fixed members 54, by insulators 56 carried by the arms 24 and 25; and when one of the gates moves from its closed position, the spring member of one of the switches engages the adjacent fixed switch member thereby closing one of the lamp circuits. The handle 9 of the motor controlling valve 8 is secured to a lift rod 57 passing through inclined slots in the upper portion of the housing 11. This lift rod 57 occupies the position seen in Fig. VI, when the motor and cages are stationary, and the motor is placed in operation by moving the controller handle so as to locate the lift rod 57 in the upper portion of the inclined slot 10. A locking device, arranged between the lift rod 57 and slide bar 35, consists of a lower section 58 seated in a notch in the slide bar 35, and an upper section 59 loosely connected to said lower section. These upper and lower sections are slidably fitted to the housing 11, and the upper section has a head 60, which normally lies directly below the slot 10.

61 designates an eccentric carried by the lower section 58, and engaging the bottom edge of the upper section. When the gate operating lever 12 is moved to open either of the gates, the horizontal slide bar 35 moves forwardly or rearwardly, and the lower end of the sectional locking device is then forced upwardly, out of the notch 62, thereby moving the head 60 into the path of the lift rod 57. The motor controller is locked by the head 60 until the gate is restored to its closed position. It will be noted that this locking device also serves to lock the gate opening mechanism while the motor is in operation, for the reason that the head 60 is then prevented from rising by the lift rod 57, which lies directly above said head when the motor is running.

As before stated, it is sometimes necessary to load a cage while it is located below the entrance to the shaft, and, in this event, the locking device just described may be rendered ineffective, so as to permit the operation of the motor and cage while an entrance gate is open. When a gate is open, the sectional locking device is elevated, and, under normal conditions, the head 60 is in the path of the lift rod 57, but, if desired, the upper section of the locking device may be dropped by turning a switch handle 65 fixed to the eccentric 61, which supports the said upper section. In turning the eccentric, the switch handle is shifted into engagement with a contact 66 so as to close an electric circuit, including a signal lamp 67, which is lighted to indicate that the lock for the motor controller is ineffective or inoperative.

To prevent the operator from accidentally opening a gate at the entrance to a shaft when the cage therein is above or below said entrance, the gate opening mechanism is locked by certain devices which unlock automatically to permit the opening of a gate when a cage reaches the shaft entrance. These locking devices comprise a slidable locking bar 70, (Figs. VI and VIII), secured to the slide bar 35 by an angular arm 71 and a link 72; and locking dogs 73 and 74 coöperable with said locking bar 70. The locking dogs are secured to pivot rods 75 mounted in bearings 76, and said locking dogs have beveled detent heads 77 adapted to engage beveled shoulders 78 and 79 on the locking bar 70. The head of the locking dog 73 is located directly opposite the beveled face 78 on locking bar 70, and the head of locking dog 74 is located directly opposite the beveled face 79.

When the gate operating handle 12 is operated so as to push the slide bar 35 forwardly, the locking bar 70 moves forwardly, with the result of lifting the locking dog 73; and when said slide bar 35 moves rearwardly from the position seen in Fig. VI, the locking dog 74 is lifted through the medium of the locking bar 70. The means for holding the locking dogs 73 and 74 in the position seen in Fig. VI to prevent the operation of the gate operating mechanism while the cages are removed from the shaft entrances, comprises a traveling cylinder 80 secured to a shaft 81, the latter being mounted in bearings 82 and 83. The shaft 81 is screwed into the bearing 82, and slidably fitted to a drive wheel 84, which is splined to the shaft, as seen in Fig. IX. The drive wheel is prevented from traveling with the shaft by a retaining finger 85 secured to the bearing 83, and extended into an annular groove in the hub of wheel 84. The wheel 84 is driven in unison with the elevator cages by means of a gear wheel 86 fixed to the crank shaft 6. When one of the cages reaches the entrance to the mine shaft, an aperture 87 in the traveling cylinder 80 registers with a pin 88 on the locking dog 73, and the gate opening mechanism is then unlocked to permit the opening of the gate at the entrance to said cage. When the other cage reaches the entrance, the aperture 89 in the traveling cylinder registers with a pin 90 on the locking dog 74, so as to unlock said dog, thereby permitting the opening of the gate at the entrance to the cage. When one of the gates is moved to its open position, one of the locking dogs is elevated by means of the locking bar 70, and the pin 88 or 90 carried by the elevated locking dog is interlocked with the traveling cylinder 80. It is possible for the operator to start the motor while the traveling cylinder is so interlocked with one of the locking dogs, and I therefore provide a danger signal in the form of an electric bell 91, adapted to operate automatically, if the motor is started while the traveling drum is interlocked with one of the locking dogs.

To provide for the operation of the signal bell 91 and to prevent breakage of parts associated with the locking dogs, the traveling cylinder 80 is yieldingly secured to the shaft 81 by a spring collar 92, which forces the traveling cylinder toward a collar 93 on the shaft 81, the spring collar 92 being compressed by nuts 94 on the shaft 81. The traveling cylinder is thus secured to the shaft so that the shaft may rotate while the said cylinder is interlocked with one of the locking dogs. The electric circuit leading to the signal bell 91 includes a switch member 95 fixed to the shaft 81, and a switch member 96 in the form of a ring secured to the traveling cylinder, see Fig. IX. These switch members are insulated from each other, and the switch member 96 is insulated from the switch member 81. The switch member 95 is formed with a tooth which normally lies opposite a recess in the switch member 96, (Fig. VI), so that the circuit about to be described is normally open between said switch members, but when the shaft 81 rotates independently of the cylinder 80, the tooth 97 on the switch member 95 contacts with the switch member 96, so as to close the circuit, thereby ringing the signal bell. The electric circuit includes a non-rotatable contact ring 98 engaging the switch member 96, and provided with an arm 99, which slides on a fixed rod 100. One of the circuit wires is fixed to the rod 100, (Fig. II), and another circuit wire is connected to the bearing 82. The elements through which these wires may be electrically connected include the rod 100, the sliding contact member 98, the switch member 96 engaging said contact member, the switch member 95 adapted to engage the switch member 96, the shaft 81 fixed to the switch member 95, and the bearing 82 to which one of the wires is connected. The locking dogs 73 and 74 are fixed to the pivot rods 75, and said pivot rods are slidably fitted to bearings 76. A shifter lever 102, pivoted at 103, is secured to the slidable pivot rods 75, for the purpose of shifting the locking dogs away from the locking bar 70 when it becomes necessary to open a gate while the cage is removed from the shaft entrance. When the shifter lever 102 is shifted to render the locking dogs ineffective, a switch arm 104, (Fig. II), carried by said lever engages contact members 105, thereby closing an electric circuit, including a signal lamp 106.

I claim:—

1. The combination with a shaft and a cage operable therein, of a gate at an entrance to said shaft, a gate operating device for moving said gate, and means for automatically locking said gate operating device when the cage moves away from said shaft entrance and automatically unlocking said gate operating device when the cage reaches said entrance; said means including a traveler movable in unison with said cage, and a locking device under the control of said traveler.

2. The combination with a shaft and a cage operable therein, of a gate at an entrance to said shaft, a gate operating device for moving said gate, and means for automatically locking said gate operating device when the cage moves away from said shaft entrance and automatically unlocking said gate operating device when the cage reaches said entrance; said means including a dog for locking said gate operating device, a traveler for retaining said dog in its operative position while the cage is away from said entrance, and means for moving said traveler in unison with said cage.

3. The combination with a shaft and a cage operable therein, of a gate at an entrance to said shaft, a gate operating device for moving said gate, and means for automatically locking said gate operating device when the cage moves away from said shaft entrance and automatically unlocking said gate operating device when the cage reaches said entrance; said means including a lock for said gate operating device, a traveler adapted to prevent the operation of said lock, and means for moving said traveler in unison with said cage.

4. The combination with a shaft and a cage operable therein, of a gate at an entrance to said shaft, a gate operating device for moving said gate, means for automatically locking said gate operating device when the cage moves away from said shaft entrance and automatically unlocking said gate operating device when the cage reaches said entrance, and an unlocking device under control of the operator for rendering said locking means ineffective.

5. The combination with a shaft and a cage operable therein, of a gate at an entrance to said shaft, a gate operating device for moving said gate, means for automatically unlocking said gate operating device when the cage moves away from said shaft entrance and automatically unlocking said gate operating device when the cage reaches said entrance, and an unlocking device under control of the operator for rendering said locking means ineffective combined with an indicator for showing the position of said unlocking device.

6. The combination with a shaft and a cage operable therein, of a gate at an entrance to said shaft, a gate operating device for moving said gate, and means for automatically locking said gate operating device when the cage moves away from said shaft entrance and automatically unlocking said gate operating device when the cage reaches said entrance; said means including a traveler, a locking member for said gate operating device adapted to interlock with said traveler when said gate occupies its open position, a shaft movable in unison with said cage, said traveler being yieldingly secured to said shaft, a signal including a switch operable when said shaft rotates independently of said traveler, said switch comprising a member secured to said traveler and a member secured to said shaft.

7. The combination with a shaft and a cage operable therein, of a motor for operating said cage, a controller for said motor, a gate at an entrance to said shaft, a gate operating device adjacent to said controller, a controller lock, operable by said gate operating device, for locking said controller when the gate occupies its open position, and means for rendering said controller lock ineffective.

8. The combination with a shaft and a cage operable therein, of a motor for operating said cage, a controller for said motor, a gate at an entrance to said shaft, a gate operating device adjacent to said controller, a controller lock, operable by said gate operating device, for locking said controller when the gate occupies its open position, means for rendering said controller lock ineffective, and an indicator showing when the controller lock is ineffective.

9. The combination with a shaft and a cage operable therein, of a motor for operating said cage, a controller for said motor located at a point remote from said cage, a gate at an entrance to said shaft, a gate operating device adjacent to said controller, a lock for said gate operating device adapted to be locked and unlocked by said controller so as to prevent the operation of said gate operating device while the cage is in motion, and means for rendering said lock ineffective.

10. The combination with a shaft and a cage operable therein, of a motor for operating said cage, a controller for said motor located at a point remote from said cage, a gate at an entrance to said shaft, a gate operating device adjacent to said controller, a lock for said gate operating device adapted to be locked and unlocked by said controller so as to prevent the operation of said gate operating device while the cage is in motion, means for rendering said lock ineffective, and an indicator showing when said lock is ineffective.

11. The combination with a shaft and a cage operable therein, of a gate at an entrance to said shaft, a motor for operating said cage, a controller for said motor located at a point remote from said cage, a gate operating device for moving said gate, means, under the control of said motor, for automatically locking said gate operating device when the cage moves away from said shaft entrance and automatically unlocking said gate operating device when the cage reaches said entrance, and a locking device, associated with said controller, adapted to lock said gate operating device in response to movements of the controller.

A. J. GURNEY.

In the presence of—
P. N. LEWIS,
R. F. MOONEYHAM.

Copies of this patent may be obtained for five cents each, by addressing the "Commissioner of Patents, Washington, D. C."